United States Patent
Osawa et al.

(10) Patent No.: US 9,452,437 B2
(45) Date of Patent: Sep. 27, 2016

(54) CENTRIFUGE AND POWER CONTROLLING APPARATUS INCLUDING A VOLTAGE SWITCHING UNIT

(75) Inventors: Hidetaka Osawa, Ibaraki (JP); Kousuke Maeno, Ibaraki (JP); Hiroyuki Takahashi, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 692 days.

(21) Appl. No.: 13/989,626

(22) PCT Filed: Nov. 25, 2011

(86) PCT No.: PCT/JP2011/077874
§ 371 (c)(1),
(2), (4) Date: Oct. 29, 2013

(87) PCT Pub. No.: WO2012/070692
PCT Pub. Date: May 31, 2012

(65) Prior Publication Data
US 2014/0045669 A1    Feb. 13, 2014

(30) Foreign Application Priority Data
Nov. 26, 2010 (JP) .................... 2010-264431

(51) Int. Cl.
*B04B 9/02* (2006.01)
*B04B 9/10* (2006.01)
(Continued)

(52) U.S. Cl.
CPC . *B04B 9/02* (2013.01); *B04B 9/10* (2013.01); *B04B 13/00* (2013.01); *B04B 15/02* (2013.01); *H02M 1/10* (2013.01); *H02M 5/458* (2013.01)

(58) Field of Classification Search
CPC .......... B04B 9/10; B04B 13/00; B04B 9/02; B04B 15/02; H02M 1/10; H02M 5/458
USPC ........ 494/1, 7–11, 13, 14, 16–21, 60, 61, 84
See application file for complete search history.

(56) References Cited

U.S. PATENT DOCUMENTS

| | | | | |
|---|---|---|---|---|
| 4,540,892 A | * | 9/1985 | Carvalho | H02M 1/10 307/130 |
| 4,843,301 A | * | 6/1989 | Belanger | H02M 1/10 323/224 |

(Continued)

FOREIGN PATENT DOCUMENTS

| | | |
|---|---|---|
| CN | 1706556 A | 12/2005 |
| CN | 1803301 A | 7/2006 |

(Continued)

OTHER PUBLICATIONS

International Search Report and Written Opinion of the International Search Report for PCT/JP2011/077874 dated Mar. 26, 2013.

(Continued)

*Primary Examiner* — Charles Cooley
(74) *Attorney, Agent, or Firm* — Kenealy Vaidya LLP

(57) ABSTRACT

A centrifuge includes a rotor which accommodates a sample, a motor which rotationally drives the rotor and a chiller which cools a rotor chamber, and is provided with a transformer which has a plurality of secondary side taps, converts an AC voltage which is input from a primary side to a plurality of voltages, and outputs, and a voltage switching unit which is connected to the plurality of secondary side taps of the transformer, selects any one of outputs of the secondary side taps, and outputs to the chiller. The microcomputer controls the voltage switching unit corresponding to the power supply frequency which is determined using the output of the zero-crossing detection circuit, and supplies the desired driving voltage to the chiller.

11 Claims, 4 Drawing Sheets

(51) Int. Cl.
*B04B 13/00* (2006.01)
*B04B 15/02* (2006.01)
*H02M 1/10* (2006.01)
*H02M 5/458* (2006.01)

(56) References Cited

U.S. PATENT DOCUMENTS

| | | | |
|---|---|---|---|
| 5,529,566 A * | 6/1996 | Weil | B04B 13/00 494/1 |
| 5,602,462 A | 2/1997 | Stich et al. | |
| 5,726,561 A | 3/1998 | Ghosh et al. | |
| 6,204,627 B1 * | 3/2001 | Watanabe | B04B 9/10 318/729 |
| 6,866,621 B1 * | 3/2005 | Muller | B04B 15/02 494/14 |
| 8,529,424 B2 * | 9/2013 | Takahashi | B04B 9/10 494/11 |
| 9,375,730 B2 * | 6/2016 | Inaniwa | B04B 15/02 |
| 2005/0272587 A1 | 12/2005 | Niinai | |
| 2006/0178253 A1 | 8/2006 | Takahashi et al. | |
| 2009/0026845 A1 | 1/2009 | Shin | |
| 2011/0059835 A1 * | 3/2011 | Takahashi | B04B 9/10 494/10 |
| 2012/0260687 A1 * | 10/2012 | Inaniwa | B04B 9/10 62/196.1 |
| 2014/0031191 A1 * | 1/2014 | Inaniwa | B04B 9/10 494/9 |
| 2014/0045669 A1 * | 2/2014 | Osawa | B04B 9/10 494/9 |

FOREIGN PATENT DOCUMENTS

| | | |
|---|---|---|
| JP | 7-51597 A | 2/1995 |
| JP | 3291856 B2 | 6/2002 |

OTHER PUBLICATIONS

Chinese Office Action for the related Chinese Patent Application No. 201180056760.9 dated Feb. 27, 2014.

* cited by examiner

CENTRIFUGE AND POWER CONTROLLING APPARATUS INCLUDING A VOLTAGE SWITCHING UNIT

This application is a U.S. national phase filing under 35 U.S.C. §371 of PCT Application No. PCT/JP2011/077874, filed Nov. 25, 2011, and which in turn claims priority under 35 U.S.C. §119 to Japanese Patent Application No. JP2010-264431, filed Nov. 26, 2010, the entireties of which are incorporated by reference herein.

TECHNICAL FIELD

The present invention relates to a centrifuge which rotates a rotor at high speed, and particularly relates to a centrifuge in which switching of a driving voltage to a chiller by determining a power supply frequency is performed automatically, and a power controlling apparatus for driving a device.

BACKGROUND ART

In the related art, a centrifuge is provided with a chiller in which a compressor that operates using a commercial power supply is mounted. The centrifuge is configured such that when centrifugally separating a sample to be separated accommodated by the rotor through rotating at high speed, the inside of the rotor chamber is cooled through driving a chiller, and controls the temperature of the sample to be a desired target temperature, in order to prevent the temperature of the sample from increasing due to frictional heat between the air in the rotor chamber and the rotor.

Specifically, the temperature in the rotor chamber is sensed using a temperature sensor, and the chiller is controlled to be turned on or off. The temperature in the rotor chamber is controlled to be close to the desired target temperature while causing the temperature in the rotor chamber to pulsate by repeating overshooting and undershooting. At this time, in order to compensate for a temperature control error, a temperature correction value is used, which is the difference between the target temperature obtained in advance through experiment and the temperature of the sample, thereby aiming at a high accuracy of the control temperature.

Some of the above described chillers are configured such that a driving voltage thereof is different according to whether the power supply frequency is 50 Hz or 60 Hz. When adopting such a chiller, it is necessary to change the driving voltage which is supplied to the chiller according to the difference in the power supply frequency. For example, when it is a chiller which operates with a driving voltage in the vicinity of AC 100 V, it is necessary to supply a driving voltage of AC 100 V in an environment where AC frequency is 50 Hz, and supply a driving voltage of AC 115 V in an environment where the AC frequency is 60 Hz.

In recent years, there is more and more demand for the centrifuge to meet the overseas standard. Many of chillers which meet such overseas standards of China, North America, or the like, are not ones which operate with the same voltage regardless of the power supply frequency (50 Hz or 60 Hz), and the operating voltages thereof differ according to the power supply frequency. For this reason, a centrifuge manufacturer has performed the task of switching the voltage according to the destination country or region, specifically, the task of switching the transformer tap connection, or the like.

In addition, regarding the power supply frequency, there are countries in which 50 Hz and 60 Hz are used together, like Japan, there are also cases where it is not possible to automatically treat the switching for each country. In this case, the connection switching operation is to be performed locally by a local installation worker according to the power supply frequency of the location where the centrifuge is installed. Such work takes time, and may have operation error or the like. In addition, there is a problem in that a local installation worker may forget the task of switching the transformer tap connection.

As an example of electrical devices for which drive ability is different according to the difference in the power supply frequency, there is a cooling fan which is driven with an AC power supply. Since the cooling fan which is driven with AC power supply has a different number of revolutions according to whether the power supply frequency is 50 Hz or 60 Hz, the air amount and fan noise thereof are different. For this reason, in Japanese Patent No. 3291856, in order to secure the necessary air amount, or to reduce the fan noise, the power supply frequency is separated so as to control the voltage to be applied to the cooling fan, however, there is no mention of changing the driving voltage of the chiller in the centrifuge.

SUMMARY

In recent years, a drive system has been known which drives a chiller using a converter circuit and/or an inverter circuit. In this system, it is advantageous in that the chiller can be driven regardless of the power supply frequency, however, on the other hand, it is disadvantageous in that the driving circuit becomes complicated, large, and expensive.

On the other hand, in order to maintain a temperature in the rotor chamber of the centrifuge to be a desired temperature, an on/off control which operates the chiller intermittently is performed. There is a concern that a mechanical on/off operation such as a relay may damage the contact, and the life of the centrifuge may be shortened, since several tens of amperes of starting current flow over several cycles, when starting up the centrifuge by turning on the chiller.

The present invention has been made in view of the above problems, and an object thereof is to provide a centrifuge in which the wiring switching task which has been performed by a local installation worker is omitted, and the switching of voltages which drive the chiller is automated.

Another object of the invention is to provide a centrifuge which is configured so as to easily switch the supply of voltage to a frequency and voltage dependent device, such as a chiller or the like, using a microcomputer.

Still another object of the invention is to provide a centrifuge which has a driving circuit of a chiller with a long life, and of which relay contact does not fuse even if the on/off control of the chiller is frequently performed, and a power controlling apparatus for driving a device.

The following are descriptions of representative aspects of the invention which are disclosed in the application of the invention.

(1) A centrifuge comprising:
 a rotor configured to accommodate a sample;
 a motor configured to rotationally drive the rotor;
 a bowl configured to define a rotor chamber which accommodates the rotor;
 a chiller configured to maintain temperature of the rotor chamber to a desired temperature by cooling the bowl;
 a control unit configured to control a rotation of the motor and an operation of the chiller;

a transformer which includes a plurality of secondary side taps and is configured to transform an AC voltage which is input from a primary side to a plurality of voltages;

a voltage switching unit configured to be connected to the plurality of secondary side taps, select any one of the plurality of secondary side taps, and output an output of the selected secondary side tap; and a frequency determination unit configured to determine a frequency of the AC voltage, wherein the control unit controls the voltage switching unit so as to select one of the plurality of secondary side taps which corresponds to the frequency determined by the frequency determination unit.

(2) The centrifuge according to (1), wherein the chiller is configured to be able to operate according to a plurality of power supply frequencies, and of which operating voltage is different for each power supply frequency.

(3) The centrifuge according to (2), wherein the AC voltage supplied to the motor and the control unit is supplied from any one of the secondary transformer taps without using the voltage switching unit.

(4) The centrifuge according to any one of (1) to (3), wherein the transformer is a step-down transformer which has the plurality of taps on primary winding and secondary winding.

(5) The centrifuge according to any one of (1) to (4), wherein
the frequency determination unit includes:
a zero-crossing detection unit which is connected to any one of the plurality of secondary side taps of the transformer, and is configured to detect timing in which an output voltage of the transformer crosses a potential of 0 V; and
a calculation unit configured to calculate the frequency by measuring the interval of the zero-crossing signal which is output from the zero-crossing detection unit.

(6) The centrifuge according to (5), wherein
the control unit includes a microcomputer configured to perform various controls using a computer program, and
the calculation unit is implemented by the microcomputer.

(7) The centrifuge according to any one of (1) to (6), wherein
the voltage switching unit is connected to the chiller through a semiconductor relay which controls turning on and off of power to the chiller, and
the control unit controls on and off states of the semiconductor relay.

(8) The centrifuge according to (7), wherein the semiconductor relay is a solid state relay with the zero-crossing detection unit built-in.

(9) A power controlling apparatus for driving a device, comprising:

a transformer which includes a plurality of secondary side taps and is configured to transform an AC voltage which is input from a primary side to a plurality of voltages;

a voltage switching unit configured to be connected to the plurality of secondary side taps, select any one of the plurality of secondary side taps, and output an output of the selected secondary side tap to the device;

a frequency determination unit configured to determine a frequency of the AC voltage; and a control unit configured to control the voltage switching unit so as to select one of the plurality of secondary side taps which corresponds to the frequency determined by the frequency determination unit.

(10) The power controlling apparatus according to (9), wherein the transformer is a step-down transformer which has the plurality of taps on primary winding and secondary winding.

(11) The power controlling apparatus according to (9), wherein the frequency determination unit includes:

a zero-crossing detection unit which is connected to any one of the plurality of secondary side taps of the transformer, and is configured to detect timing in which an output voltage of the transformer crosses a potential of 0 V; and a calculation unit configured to calculate the frequency by measuring the interval of the zero-crossing signal which is output from the zero-crossing detection unit.

According to a first aspect, it is possible to provide a centrifuge in which a local wiring switching work is omitted, and a switching of a voltage which drives a chiller is automated, since the centrifuge is configured to include a voltage switching unit which is connected to a plurality of secondary side transformer taps, selects any one of outputs of the secondary side taps, and outputs to the chiller. In addition, a control unit thereof operates the voltage switching unit to select a secondary side tap which corresponds to a power supply frequency which is determined using a frequency determination unit, and an appropriate voltage is supplied to the chiller.

According to a second aspect, it is possible to provide a centrifuge which is able to automatically supply an appropriate power supply voltage according to the power supply frequency, since the chiller is configured to be able to operate according to a plurality of power supply frequencies, and of which the operating voltage is different for each power supply frequency.

According to a third aspect, since an AC voltage which is supplied to a motor and the control unit is supplied from any one of the secondary transformer taps without using the voltage switching unit, it is possible to stably operate the centrifuge without being influenced by temporary interruption when the voltage is switched using the voltage switching unit.

According to a fourth aspect, since the transformer is a step-down transformer which has a plurality of taps on the primary winding and secondary winding, it is possible to be adopted in countries which use a plurality of power supply voltages and power supply frequencies.

According to a fifth aspect, the control unit is able to perform appropriate management of the power supply voltage which corresponds to the power supply frequency, since the power supply frequency is calculated by measuring the interval of the zero-crossing signal which is output from the zero-crossing detection unit.

According to a sixth aspect, the control unit can perform various controls using a computer program, since the control unit includes a microcomputer, and the calculation unit is implemented by the microcomputer.

According to a seventh aspect, it is possible to make a life of the driving circuit of the chiller longer, since the voltage switching unit is connected to the chiller through a semiconductor relay which controls the turning on or off of power to the chiller, accordingly, the chiller is not directly turned on or off at a mechanical contact such as a relay, or the like.

According to an eighth aspect, it is possible for the chiller to stably operate when starting up, and to suppress the noise level thereof, since the semiconductor relay is a solid state relay with the zero-crossing detection unit built-in, and it is possible to perform the switching to the on state of the output voltage when it is 0 V, and the starting current of the chiller is stable.

The above described objects, other objects, and new aspects of the invention will be clarified from the descriptions and drawings below.

DESCRIPTION OF EXEMPLARY EMBODIMENTS

First Embodiment

Figure 1:
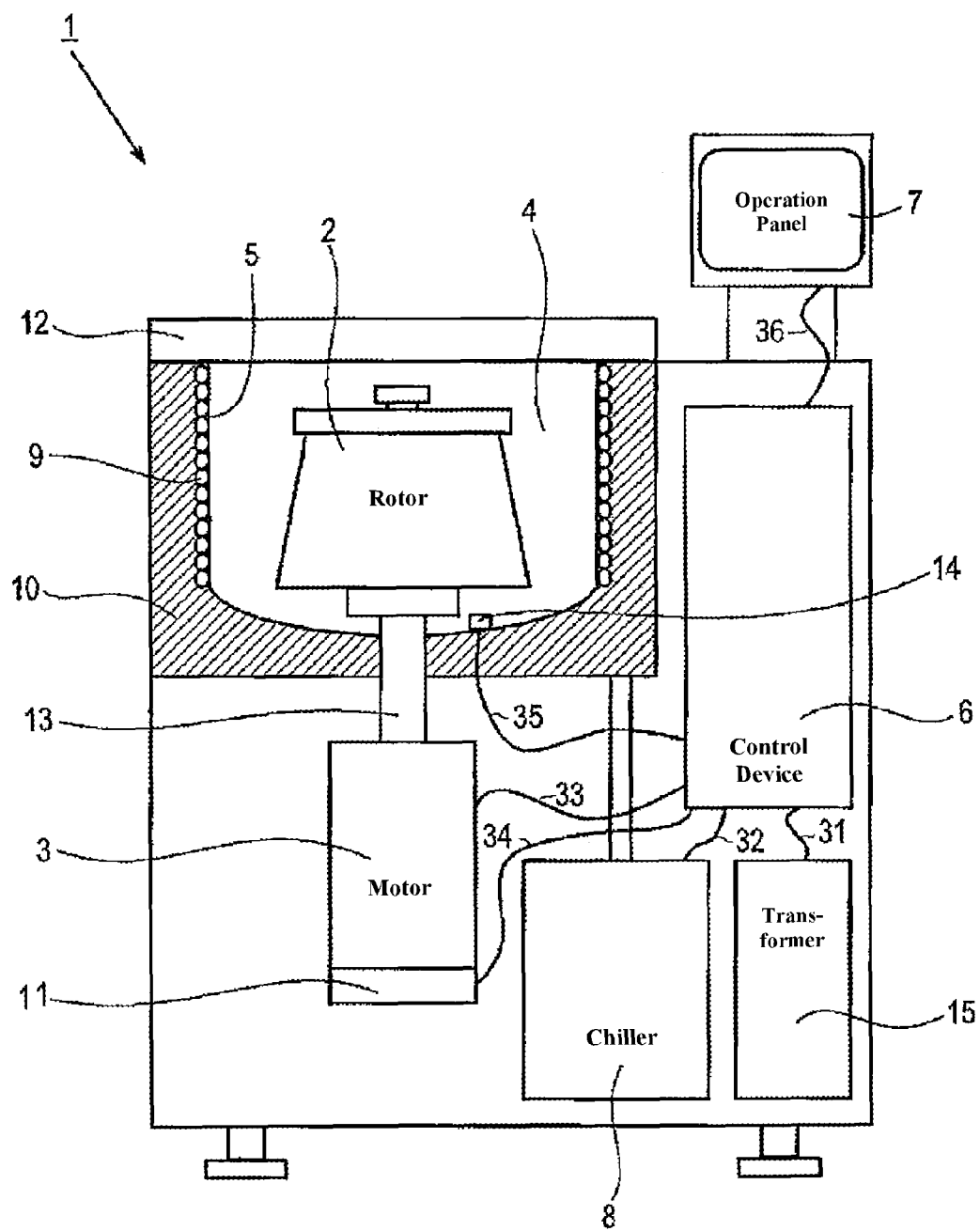
FIG. 1 is a cross-sectional view which shows an outline of the overall configuration of the centrifuge according to an embodiment of the invention.

Hereinafter, embodiments of the invention will be described with reference to the drawings. In addition, in the drawings in below, the same portions will be denoted by the same reference numerals, and descriptions thereof will be omitted. FIG. 1 is a cross-sectional view which shows an outline of the overall configuration of the centrifuge 1 according to the embodiment of the invention.

The centrifuge 1 is provided with a rotor chamber 4 in the main body, and includes an encoder 11 on the lower side of the rotor chamber 4, which detects a motor 3 as a driving source, and the number of revolutions of the motor 3. A rotor 2 is detachably mounted at the tip end portion of an output shaft (motor shaft) 13 which extends to the inside of a bowl 5, which is above the motor 3. The bowl 5 is a container of a substantially cylindrical shape with a circular opening portion at the top portion, and defines the rotor chamber 4. The opening portion at the top of the bowl 5 is configured to be openable and closable by a door 12. When operating the centrifuge 1, the door 12 is locked and sealed using a lock mechanism, which is not shown, so as not to open. An evaporator 9 which is piped by a chiller 8 is wound around the outer periphery of the bowl 5, and is covered with a heat insulator 10. A temperature sensor 14 which detects the temperature in the rotor chamber 4, or radiant heat from the rotor 2 is provided at the bottom of the rotor chamber 4. Here, the chiller 8 is an electrical device which cools the temperature of the bowl 5 to a predetermined temperature, and is referred to as a refrigerating machine or a freezing machine. The type of the chiller 8 may be one which uses refrigerant, in which the refrigerant is compressed while being circulated in a closed pipe, and other chillers may be used.

An operation panel 7 is provided on the centrifuge 1. When set as a liquid crystal display touch-panel, the operation panel 7 can function as an operation panel to which a variety of information is input, rather than as a panel which displays information only. A control device 6 is provided in the centrifuge 1. The control device 6 is configured by a microcomputer, a timer, a storage device, or the like, which are not shown, and performs overall control of the centrifuge 1, including rotation control of the motor 3, and operation control of the chiller 8 which controls the temperature in the rotor chamber 4. The control device 6 is electrically connected to each unit through a voltage switching control line 31 of the transformer 15, a control signal line 32 to the chiller 8, a rotation control line 33 of the motor 3, an output signal line 34 from the encoder 11, an output signal line 35 of the temperature sensor 14, and an input output line 36 to the operation panel 7.

Figure 2:
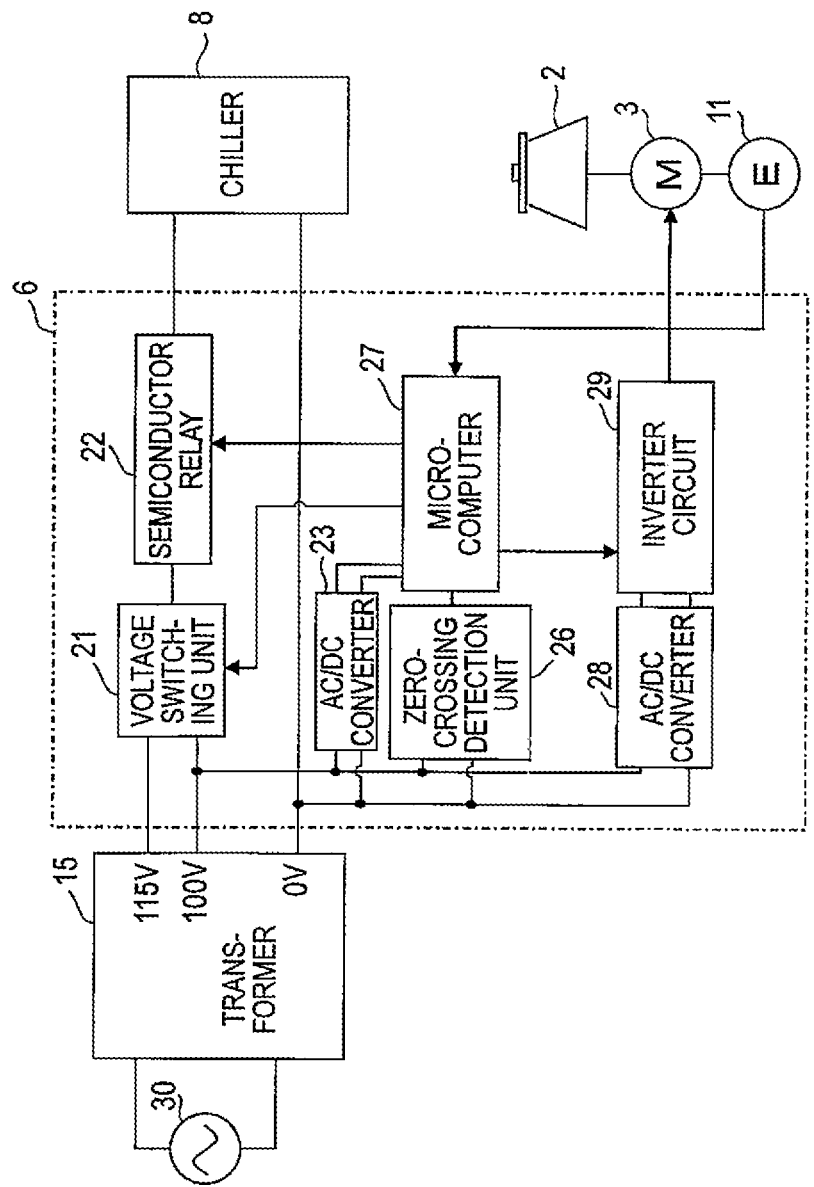
FIG. 2 is a block diagram which shows a power supply circuit of the centrifuge 1 according to the embodiment of the invention.

Subsequently, the switching of driving voltage to the chiller 8 according to the determination of the power supply frequency of the centrifuge 1 will be described with reference to FIGS. 2 and 3. FIG. 2 is a block diagram which shows a power supply circuit of the centrifuge 1 according to the embodiment of the invention.

When connecting a power code (not shown) which is provided in the centrifuge 1 to an outlet of a commercial power supply 30, the commercial power supply 30 is input to the primary side of the transformer 15. The transformer 15 is a device which converts an AC voltage using electromagnetic induction. For example, the transformer generates a magnetic field which changes according to an alternating current of the winding on the input side (primary winding), and converts the magnetic field to a current again through transmission to winding on the output side (secondary winding) which is coupled by mutual inductance. As a magnetic circuit which is coupled by the mutual inductance, for example, an iron core is used, and a plurality of taps is provided on the secondary winding side in order to correspond to a secondary voltage which is a different voltage. In addition, in a case of corresponding to a primary voltage which is a different voltage, it is preferable to provide a plurality of taps on the primary winding side, as well. According to the embodiment, for example, five taps (terminals) of 0 V, 200 V, 208 V, 220 V, 230 V, and 240 V are provided on the primary winding side, however they are not shown, and arbitrary taps (for example, taps of 0 V and 220 V when the commercial voltage is 220 V) are selected according to the commercial power supply voltage. Similarly, three taps of 0 V, 100 V, and 115 V are provided on the secondary winding side, and the taps of 100 V, and 115 V are connected to the input side of the voltage switching unit 21.

A different voltage line (AC 100 V or AC 115 V) which is output from a different tap of the transformer 15 is connected to the voltage switching unit 21. The voltage switching unit 21 is operated by a microcomputer 27, and selects and outputs any one of different voltage lines. According to the embodiment, it is configured so that only the voltage which is supplied to the electrical device which depends on the frequency and voltage, such as the chiller 8, is switched using the voltage switching unit 21, and the voltage line is connected to another electrical device (for example, an electrical device which depends on neither the frequency nor the voltage, in other words, an electrical device which is driven by a voltage which is further converted) from the tap of AC 100 V rather than through the voltage switching unit 21. In addition, according to the embodiment, an example was shown in which the voltage line is connected to the other electrical device from the tap of AC 100 V, however, it may be connected from the tap on the AC 100 V side of the transformer 15, or from a tap of another voltage.

The voltage lines (AC 100 V and 0 V) which are output from the transformer 15 are connected to an AC/DC converter 23 which generates a low voltage, for example, AC 5 V for the microcomputer 27, a zero-crossing detection unit 26 for determining the frequency of the commercial voltage, and an AC/DC converter 28 which generates an AC voltage for an inverter circuit 29 which drives the motor 3. The zero-crossing detection unit 26 generates a zero-crossing signal at a timing when an output wave of 100 V of the transformer 15 crosses a potential current of 0 V, and transmits the signal to the microcomputer 27. The microcomputer 27 executes a determination processing of the power supply frequency which will be described later, and determines the power supply frequency using an embedded timer. This determination is, for example, to distinguish whether the frequency of the commercial voltage is 50 Hz or 60 Hz. The microcomputer 27 controls the voltage switching unit 21 so that an appropriate voltage corresponding to the power supply frequency is to be supplied to the chiller 8 from the determined power supply frequency information.

Figure 3:
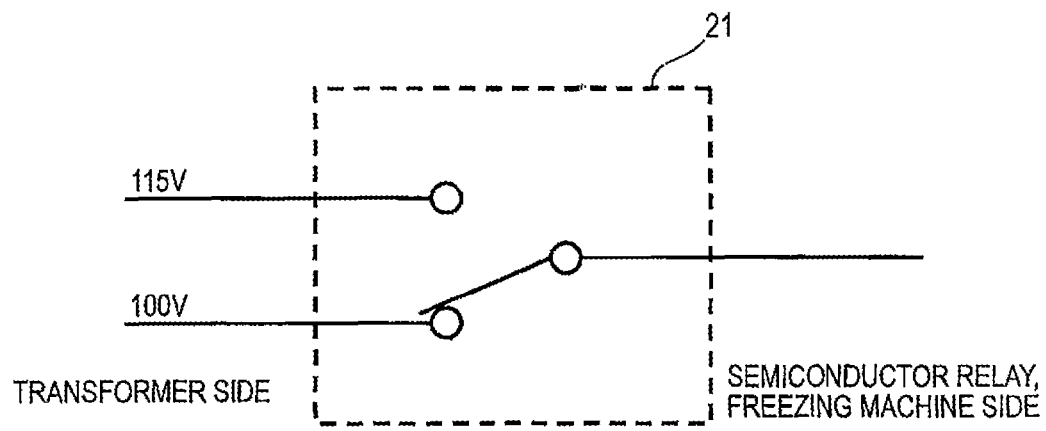
FIG. 3 is a switching circuit diagram which shows a configuration of the voltage switching unit in FIG. 2.

FIG. 3 is a diagram of a switching circuit which shows an embodiment of the voltage switching unit 21 of the centrifuge 1 according to the invention. The voltage switching unit 21 shown in FIG. 3 is a c contact-type relay, and switches the contact destination to a contact (a) or a contact (b) according to the on or off states of the relay. The c contact-type relay rarely withstands a large current of the chiller or the like, and a high capacity type thereof is large and expensive.

Figure 4:
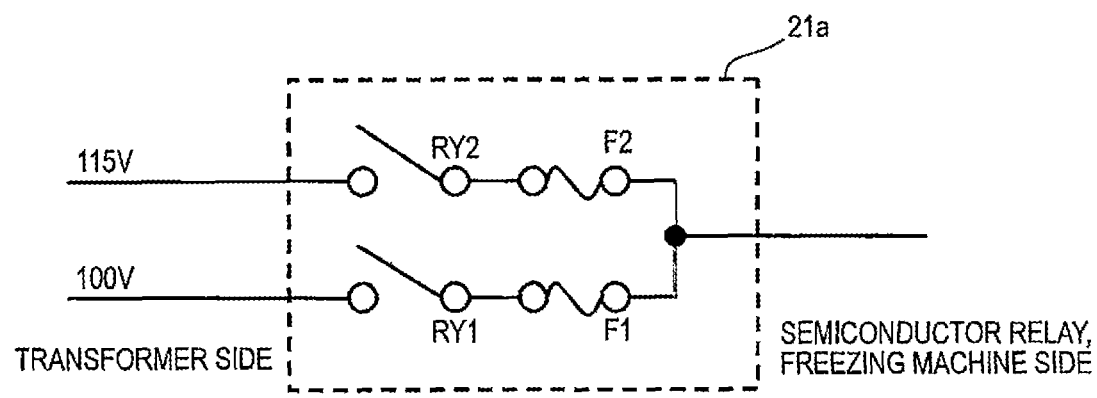
FIG. 4 is a switching circuit diagram which shows a configuration of a modification of the voltage switching unit in FIG. 2.

In addition, as a modified example of the voltage switching unit 21, a voltage switching unit 21a shown in FIG. 4 may be used. The voltage switching unit 21a is provided with two relays (RY 1 and RY 2) of an a contact-type which is relatively inexpensive, and executes the switching of voltages by turning on any one of the two relays RY 1 and RY 2 using the microcomputer 27. When two relays RY 1 and RY 2 are turned on at the same time accidently, in the voltage switching unit 21a, a short circuit occurs between the transformer 15. For this reason, fuses (F1 and F2) are provided, which also protect the chiller 8.

Returning to FIG. 2, the semiconductor relay 22 disposed between the output side of the voltage switching unit 21 and the chiller 8 is a switching unit of which on or off states are controlled by the microcomputer 27, and for example, a solid state relay (SSR) is used. It is possible to use an electromagnetic relay, however, since deterioration of the contact can be prevented when using a solid state relay, which is a non-contact relay in which a semiconductor is used, it is possible to make the relay operate stably for a long time. The solid state relay is a semiconductor control component of which the input side and output side are insulated, and of which function of matching the on or off states of the input and output can be made non-contact using the semiconductor device.

In addition, since usually the starting current of the chiller 8 is large, noise is easily generated when starting up. Therefore, it is preferable to use a solid state relay with the zero-crossing detection unit built-in, which is configured to be turned on from the potential of 0 V, without using a solid state relay for a phase control. In the solid state relay with the zero-crossing detection unit built-in, when an input voltage is applied in the vicinity of the peak value of an AC power supply voltage, the current does not flow immediately to the output circuit due to an operation of the zero-crossing circuit. When the AC power supply voltage decreases to the vicinity of 0 V, a triac of the output circuit of the solid state relay is turned on, and the current flows to the load. In this manner, in the solid state relay with the zero-crossing detection unit built-in, switching to the on state of the output voltage is performed when the AC power supply voltage is 0 V, therefore, the starting current of the chiller 8 becomes stable, and it is possible to significantly extend the life of the chiller 8, and suppress the noise of the chiller when starting up.

One of the voltage lines (AC 100 V and 0 V) which are output from the transformer 15 is input to the AC/DC converter 23. The AC/DC converter 23 provides the operating power to the microcomputer 27 and the other control device 6, the operation panel 7, or the like, form the commercial AC power. Here, the AC/DC converter 23 is connected to the front side of the voltage switching unit 21 (input side), not to the rear side (output side), because the output voltage from the voltage switching unit 21 is instantaneously broken when the voltage switching unit 21 performs switching, and the operation of the microcomputer 27 is influenced due to the temporary interruption. In addition, if a back-up power supply is provided, which compensates for the temporary interruption of the output voltage from the voltage switching unit 21, in the microcomputer 27, the AC/DC converter 23 may be connected to the rear side (output side) of the voltage switching unit 21.

The voltage lines (AC 100 V and 0 V) which are output from the transformer 15 further input to an AC/DC converter 28. The AC/DC converter 28 generates a high voltage DC voltage which drives the motor 3 from the commercial AC power supply, and is connected to an inverter circuit 29. The inverter circuit 29 is a circuit which supplies a driving voltage sequentially to a stator winding of the motor 3, for example, a three-phase brushless DC motor which is star-connected using six semiconductor switching devices, or the like. The inverter circuit 29 is controlled by the microcomputer 27 using the revolution count signal which is detected by the encoder 11. As described above, the microcomputer 27 performs the control of the number of revolutions of the motor 3, and performs the operation of the centrifugal separation of the sample in the rotor 2 by a predetermined number of revolutions and a predetermined time.

Figure 5:
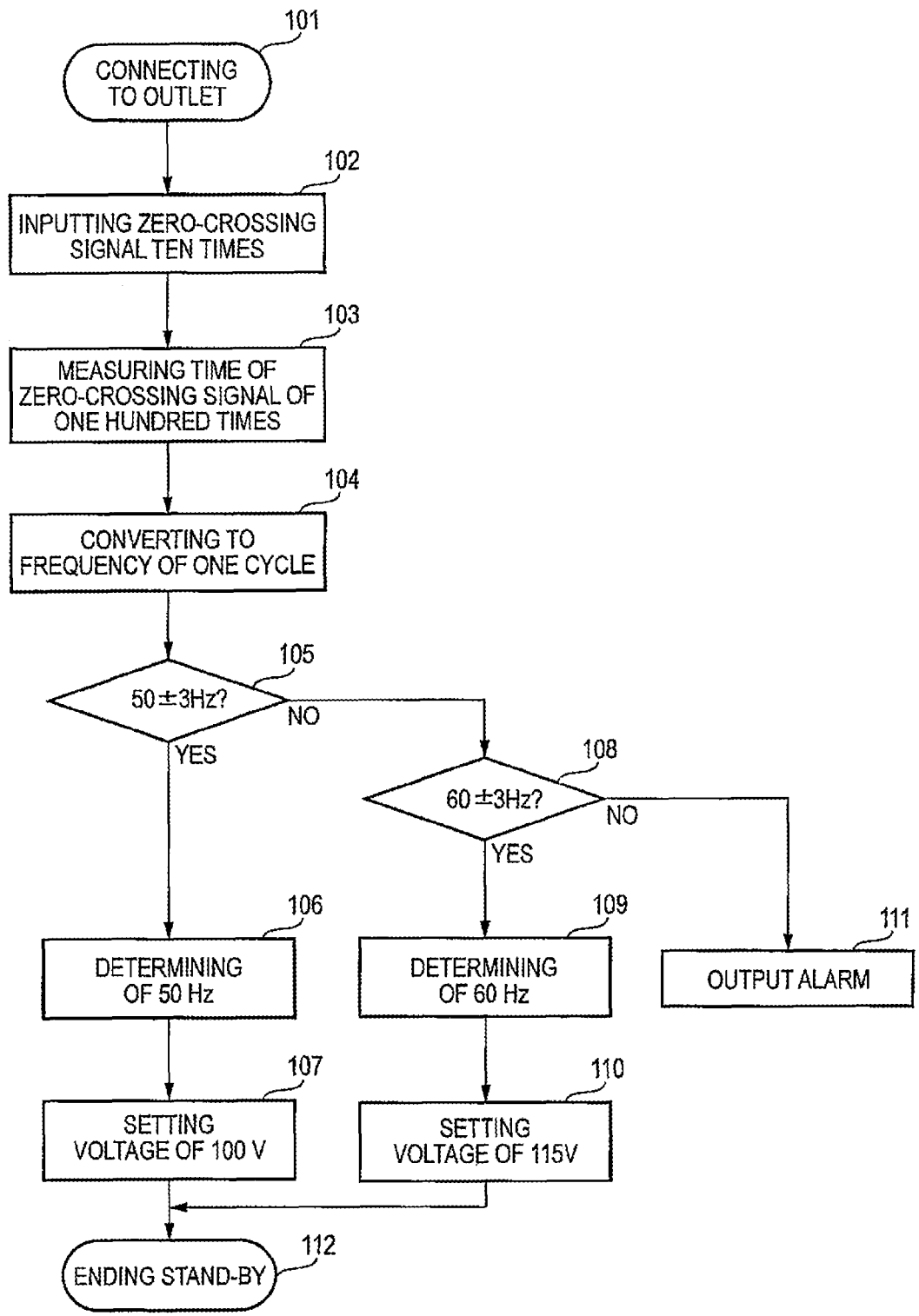
FIG. 5 is a flowchart which shows a processing order of power supply frequency determination of the centrifuge according to the embodiment of the invention.

Subsequently, the order of determination processing of the power supply frequency will be described using the flowchart in FIG. 5. FIG. 5 is a flowchart which shows the determination processing of the power supply frequency of the centrifuge 1 according to the embodiment of the invention. The order shown in FIG. 5 is executed when the power code of the centrifuge 1 is connected to an outlet of the commercial power supply. When the power code is connected to the outlet, a commercial power supply 30 is supplied to the primary side of the transformer 15. There are various voltages such as 200 V, 208 V, 20 V, 230 V, 240 V, or the like, in the commercial power supply 30 to be used according to the country or region, however, an appropriate input terminal of the transformer is selected by being connected to the appropriate input terminal of the transformer when it is assembled in the factory, or by a local worker who installs the centrifuge 1.

When the commercial power supply 30 is supplied to the primary side of the transformer 15, output power supply which corresponds to a predetermined turn ratio is output to the tap of 100 V, or 115 V which is the secondary side terminal of the transformer 15. The voltages which are output from the taps of 100 V and 0 V on the secondary side are input to the zero-crossing detection unit 26, and a zero-crossing signal is input to an external interrupt terminal of the microcomputer 27 from the zero-crossing detection unit 26.

First, when the power supply outlet is connected (Step 101), the microcomputer 27 waits until the zero-crossing signal is input ten times (Step 102), since an AC signal of a predetermined voltage is input to the zero-crossing detection unit 26. The reason is to wait until voltage distortion which occurs immediately after the power connection disappears, and to check whether or not the zero-crossing signal is properly generated by the zero-crossing detection unit 26. At the same time, the output signal (zero-crossing signal) from the zero-crossing detection unit 26 and the timer of the microcomputer 27 are synchronized, using the zero-crossing signal. An output interval (interrupt interval) of the zero-crossing signal is 10 ms in a case of 50 Hz, and 8.3 ms in a case of 60 Hz.

Thereafter, a time when the zero-crossing signal is further input by one hundred times is measured (Step 103). At this time, when there is a case in which a signal of an interrupt interval of the zero-crossing signal is abnormally short (for example, within 5 ms), it is determined that there is noise mixed, and the abnormal signal with short interval may not be counted. Subsequently, the mean time of one cycle is calculated from the time of one hundred times of zero-crossing signal, and the mean time is converted to a frequency (Step 104).

Subsequently, it is determined that the value which is converted to the frequency is within 50±3 Hz (Step 105). If the converted value is in the range of 50±3 Hz, the power supply frequency is determined to be 50 Hz (Step 106), and the microcomputer 27 selects the 100 V tap as the output of the transformer 15 to be output to the chiller 8 using a signal which is set by the voltage switching unit 21 (Step 107). At this time, since the ground output (0 V) of the transformer 15 is connected to the chiller 8 in advance, a circuit in which the AC 100 V is supplied to the chiller 8 is formed when selecting the 100 V tap by the voltage switching unit 21.

When the converted value to the frequency is not within 50±3 Hz in Step 105, it is determined whether or not it is within 60±3 Hz (Step 108). If the converted value is within 60±3 Hz, the power supply frequency is determined to be 60 Hz (Step 109), and the microcomputer 27 selects the 115 V tap as the output of the transformer 15 to be output to the chiller 8 using a signal which is set by the voltage switching unit 21 (Step 110). If the converted value to the frequency is not within 60±3 Hz in Step 108, it is determined as an abnormal power supply frequency, and an alarm is output (Step 111), since it is neither 50 Hz or 60 Hz. The method of outputting the alarm may be various well-known methods, and for example, it may be a sound warning. In addition, it is preferable to display that "the power supply frequency is abnormal", and the situation thereof on the operation panel 7, at the same time. In addition, In Steps 105 and 108, whether or not the desired frequency is within the range of ±3 Hz is checked, however the range of ±3 Hz is not limited thereto, and may be arbitrarily set according to the specification of the chiller 8 to be used, and the centrifuge 1.

When the correct voltage is set in Step 107 or 110, the chiller 8 of the centrifuge 1 goes into a drivable state, that is, a stand-by state. Since devices other than the chiller 8 which do not depend on the power supply frequency and power supply voltage are connected to the output taps (here, 100 V and 0 V) of the transformer 15 in advance, control of the voltage setting is not necessary. In this state, the microcomputer 27 waits for the setting and starting (pressing down the start button) of an operation of the centrifugal separation, which is performed by a user (an operator).

The user (operator) sets a sample (not shown) in the rotor 2, and mounts the rotor on the tip end portion of the motor shaft 13. The door 12 is closed, parameters such as the number of revolutions of the rotor 2, centrifuging time, preset temperature, or the like are input from the operation panel 7, and the operation of the centrifuge is started. The control device 6 controls the number of revolutions of the motor 3 by feeding back the signal of the number of revolutions detected by the encoder 11, on the basis of the input number of revolutions. At this time, the control device 6 intermittently operates the chiller 8 by feeding back a detection temperature of the temperature sensor 14 which is provided at the bottom of the rotor chamber 4 to which the rotor 2 is accommodated, and by controlling the on or off states of the chiller 8 using the semiconductor relay 22 so that the temperature of the rotor 2 becomes the preset temperature.

The contact of the voltage switching unit 21 is switched to a voltage which corresponds to the power supply frequency by the microcomputer 27. When the semiconductor relay 22 is turned on, the appropriate voltage which is preset is supplied to the chiller 8, and the operation of the chiller 8 is started. In this manner, the voltage switching operation of the voltage switching unit 21 is performed when being connected to the power supply outlet as shown in the flowchart in FIG. 5. The controlling of on or off states of the chiller 8 is performed using the semiconductor relay 22. Accordingly, since the contact portion of the voltage switching unit 21 does not perform a switching operation for a large current, the load on the contact portion of the voltage switching unit 21 is relieved, and it is not necessary to worry about the life of the contact.

As described above, according to the embodiment, since the electrical power supply frequency is determined so as to supply an appropriate voltage to the chiller, it is possible to omit the switching operation of the secondary side wiring of the transformer which has been performed in installation countries and regions in the related art, and realize a centrifuge in which the switching of voltage which drives the chiller is automated. In addition, since the chiller is assumed to be driven using the semiconductor relay, without turning on or off the chiller at a mechanical contact such as a relay or the like, it is possible to provide a centrifuge with a long life.

As described above, the invention which has been performed by the inventor was described on the basis of the embodiment, however, the invention is not limited to the above described embodiment, and various changes may be made without departing from the scope of the invention. For example, in the above described embodiment, the chiller was exemplified as a device which is dependent on the frequency and voltage in the centrifuge, however, it is not limited to the chiller. When there is another device which depends on the frequency and voltage (for example, an AC fan, or the like), a power controlling apparatus according to the invention may be configured to supply a voltage to the device through the voltage switching unit 21 of the power controlling apparatus.

This application is based upon and claims the benefit of priority of Japanese Patent Application No. 2010-264431 filed on Nov. 26, 2010, the contents of which are incorporated herein by reference in its entirety.

The invention claimed is:
1. A centrifuge comprising:
a rotor configured to accommodate a sample;
a motor configured to rotationally drive the rotor;
a bowl configured to define a rotor chamber which accommodates the rotor;
a chiller configured to maintain temperature of the rotor chamber to a desired temperature by cooling the bowl;
a control unit configured to control a rotation of the motor and an operation of the chiller;
a transformer which includes a plurality of secondary side taps and is configured to transform an AC voltage which is input from a primary side to a plurality of voltages;
a voltage switching unit configured to be connected to the plurality of secondary side taps, select any one of the plurality of secondary side taps, and output an output of the selected secondary side tap; and a frequency determination unit configured to determine a frequency of the AC voltage, wherein the control unit controls the voltage switching unit so as to select one of the plurality of secondary side taps which corresponds to the frequency determined by the frequency determination unit.

2. The centrifuge according to claim 1, wherein the chiller is configured to be able to operate according to a plurality of power supply frequencies, and of which operating voltage is different for each power supply frequency.

3. The centrifuge according to claim 2, wherein the AC voltage supplied to the motor and the control unit is supplied from any one of the secondary transformer taps without using the voltage switching unit.

4. The centrifuge according to claim 1, wherein the transformer is a step-down transformer which has the plurality of secondary side taps on secondary winding and a plurality of taps on primary winding.

5. The centrifuge according to claim 1, wherein
the frequency determination unit includes:
a zero-crossing detection unit which is connected to any one of the plurality of secondary side taps of the transformer, and is configured to detect timing in which an output voltage of the transformer crosses a potential of 0 V; and
a calculation unit configured to calculate the frequency by measuring the interval of the zero-crossing signal which is output from the zero-crossing detection unit.

6. The centrifuge according to claim 5, wherein
the control unit includes a microcomputer, and
the calculation unit is implemented by the microcomputer.

7. The centrifuge according to claim 1, wherein
the voltage switching unit is connected to the chiller through a semiconductor relay which controls turning on and off of power to the chiller, and
the control unit controls on and off states of the semiconductor relay.

8. The centrifuge according to claim 7, wherein the semiconductor relay is a solid state relay with a zero-crossing detection unit built-in.

9. A power controlling apparatus for driving a device, comprising:
a transformer which includes a plurality of secondary side taps and is configured to transform an AC voltage which is input from a primary side to a plurality of voltages;
a voltage switching unit configured to be connected to the plurality of secondary side taps, select any one of the plurality of secondary side taps, and output an output of the selected secondary side tap to the device;
a frequency determination unit configured to determine a frequency of the AC voltage; and
a control unit configured to control the voltage switching unit so as to select one of the plurality of secondary side taps which corresponds to the frequency determined by the frequency determination unit.

10. The power controlling apparatus according to claim 9, wherein the transformer is a step-down transformer which has the plurality of secondary side taps on secondary winding and a plurality of taps on primary winding.

11. The power controlling apparatus according to claim 9, wherein
the frequency determination unit includes:
a zero-crossing detection unit which is connected to any one of the plurality of secondary side taps of the transformer, and is configured to detect timing in which an output voltage of the transformer crosses a potential of 0 V; and
a calculation unit configured to calculate the frequency by measuring the interval of the zero-crossing signal which is output from the zero-crossing detection unit.

* * * * *